(12) United States Patent
Sudo et al.

(10) Patent No.: US 10,075,638 B2
(45) Date of Patent: Sep. 11, 2018

(54) APPARATUS THAT PERFORMS ZOOMING OPERATION, CONTROL METHOD THEREFOR, AND STORAGE MEDIUM

(71) Applicant: CANON KABUSHIKI KAISHA, Tokyo (JP)

(72) Inventors: Koji Sudo, Machida (JP); Shin Murakami, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 209 days.

(21) Appl. No.: 14/719,559

(22) Filed: May 22, 2015

(65) Prior Publication Data
US 2015/0350525 A1 Dec. 3, 2015

(30) Foreign Application Priority Data

May 29, 2014 (JP) ................ 2014-111059

(51) Int. Cl.
H04N 5/232 (2006.01)
H04N 101/00 (2006.01)

(52) U.S. Cl.
CPC ..... *H04N 5/23245* (2013.01); *H04N 5/23293* (2013.01); *H04N 5/23296* (2013.01); *H04N 2101/00* (2013.01)

(58) Field of Classification Search
CPC .......... H04N 5/23245; H04N 5/23296; H04N 5/23293; H04N 2101/00
See application file for complete search history.

(56) References Cited

U.S. PATENT DOCUMENTS 5,036,352 A * 7/1991 Kamimura ............. G03B 21/11
355/45
8,305,464 B2 * 11/2012 Suzuki .................. H04N 5/232
348/231.99
(Continued)

FOREIGN PATENT DOCUMENTS

CN 101802705 A 8/2010
CN 103858420 A 6/2014
(Continued)

OTHER PUBLICATIONS

JP 2002-112097 Translation.*
(Continued)

*Primary Examiner* — Twyler Haskins
*Assistant Examiner* — Angel L Garces-Rivera
(74) *Attorney, Agent, or Firm* — Fitzpatrick, Cella, Harper & Scinto

(57) ABSTRACT

An image pickup apparatus which enhances usability in shooting in a case where a user sets an initial lens position. A system control unit starts shifting a zoom position of a taking lens in response to start of a zooming operation in which the zoom position is changed, and stops shifting the zoom position in response to termination of the zooming operation. When the zoom position reaches a predetermined zoom position, which is inside an optical zoom range and is neither an optical wide-angle end nor an optical telephoto end, while the zoom position is being shifted in a first direction in response to a first zooming operation for shifting the zoom position in the first direction, the system control unit provides control to fix the zoom position at the predetermined zoom position even when the first zooming operation has not been terminated.

33 Claims, 9 Drawing Sheets

(56) References Cited

U.S. PATENT DOCUMENTS

| | | |
|---|---|---|
| 8,350,945 B2 | 1/2013 | Yumiki |
| 8,994,868 B2 | 3/2015 | Yumiki |
| 9,282,254 B2 | 3/2016 | Watanabe |
| 2008/0025712 A1* | 1/2008 | Furuya ................ G03B 17/18 396/88 |
| 2014/0125846 A1* | 5/2014 | Alakarhu ............. G02B 7/102 348/240.99 |
| 2014/0211078 A1 | 7/2014 | Watanabe |

FOREIGN PATENT DOCUMENTS

| | | |
|---|---|---|
| JP | H02-068507 A | 3/1990 |
| JP | H03-033836 A | 2/1991 |
| JP | H04-076777 U | 7/1992 |
| JP | 2002-112097 A | 4/2002 |
| JP | 2004-349844 A | 12/2004 |
| JP | 2005-208395 A | 8/2005 |
| JP | 2007-178453 A | 7/2007 |
| JP | 4837351 B2 | 12/2011 |

OTHER PUBLICATIONS

Aug. 10, 2017 Chinese Official Action in Chinese Patent Application No. 201510290315.9.
May 2, 2017 Chinese Official Action in Chinese Patent Appln. No. 201510290315.9.

* cited by examiner

APPARATUS THAT PERFORMS ZOOMING OPERATION, CONTROL METHOD THEREFOR, AND STORAGE MEDIUM

BACKGROUND OF THE INVENTION

Field of the Invention

The present invention relates to an image pickup apparatus, a control method therefor, and a storage medium, and an image pickup apparatus which performs a zooming operation, a control method therefor, and a storage medium.

Description of the Related Art

Cameras have a zooming mechanism which varies the zoom ratio, and in recent years, cameras have been increased in the angle of view and focal length. With a wide angle of view, it is possible to easily see a subject, and hence on starting of a camera, a lens of the camera is usually positioned at a wide-angle end.

On the other hand, there is a camera which, for a user who does not desire to position a lens at a wide-angle end on starting of the camera, automatically moves the lens to a lens position set by the user on starting of the camera (see Japanese Laid-Open Patent Publication (Kokai) No. 2002-112097).

According to Japanese Laid-Open Patent Publication (Kokai) No. 2002-112097, however, the camera moves the lens to a lens position set by a user only on starting of the camera, and hence in a case where the lens position is changed after the start of the camera, the lens does not automatically move from the changed lens position to the lens position set by the user. Accordingly, the user needs to manually change the lens position whenever he or she performs shooting even when the user desires to perform shooting at a self-set lens position. Thus, changing the lens position takes much time, and a perfect moment to take a picture may be missed. Namely, a problem arises since shooting cannot be performed with ease at lens positions set at times except on starting.

SUMMARY OF THE INVENTION

The present invention provides an image pickup apparatus and a control method therefor, which enhance usability in shooting in a case where a user sets an initial lens position, as well as a storage medium.

Accordingly, the present invention provides an image pickup apparatus comprising a zooming operation unit configured to accept a zooming operation in which a zoom position of a taking lens is changed, and a control unit configured to provide control to, in response to start of the zooming operation, start shifting the zoom position, and in response to termination of the zooming operation, stop shifting the zoom position, wherein when the zoom position reaches a predetermined zoom position which is inside an optical zoom range and is neither an optical wide-angle end nor an optical telephoto end while the control unit is shifting the zoom position in a first direction in response to a first zooming operation for shifting the zoom position in the first direction, the control unit provides control to fix the zoom position at the predetermined zoom position even when the first zooming operation has not been terminated.

According to the present invention, shifting of the zoom position of the taking lens is started in response to starting of the zooming operation, and shifting of the zoom position is stopped in response to termination of the zooming operation, and on the other hand, when the zoom position reaches the predetermined zoom position in the optical zoom range while the zoom position is being shifted in the first direction, the zoom position is fixed at the predetermined zoom position even when the zooming operation has not been terminated. This enhances usability in shooting based on a lens position that has been set.

Further features of the present invention will become apparent from the following description of exemplary embodiments (with reference to the attached drawings).

DESCRIPTION OF THE EMBODIMENTS

The present invention will now be described in detail with reference to the drawings showing an embodiment thereof.

Figure 1:
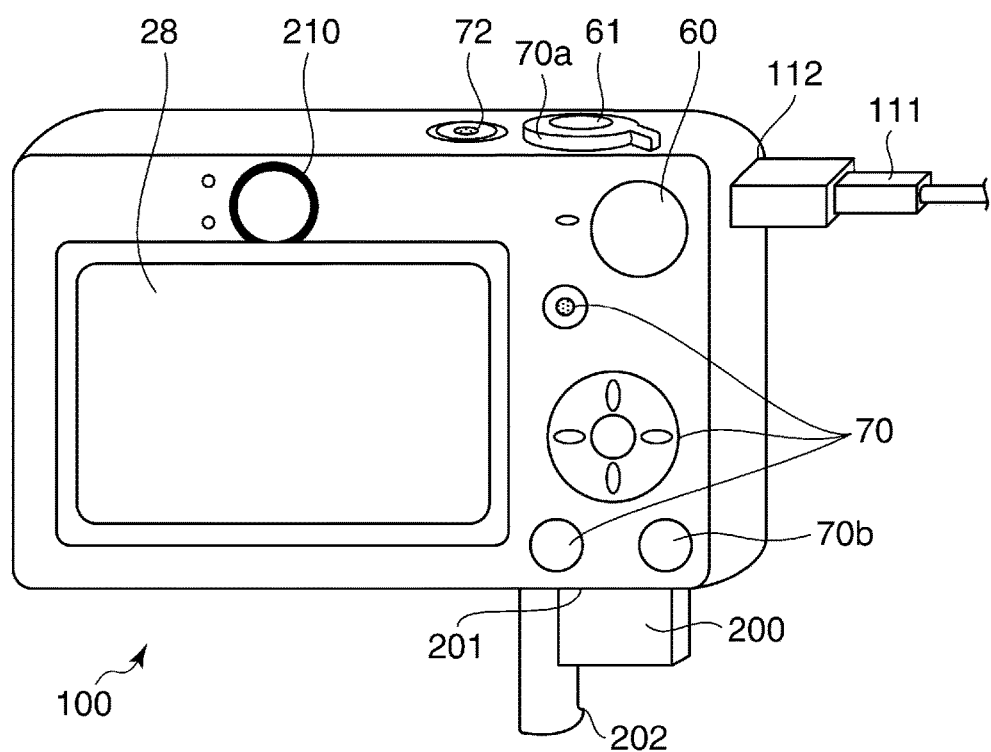
FIG. 1 is a rear view showing a digital camera which is an image pickup apparatus according to an embodiment of the present invention.

FIG. 1 is a rear view showing a digital camera 100 which is an image pickup apparatus according to the embodiment of the present invention.

The digital camera 100 in FIG. 1 has, in a main body thereof, a display unit 28, a mode selector switch 60, a shutter button 61, an operating unit 70, a power switch 72, a connecting cable 111, a connector 112, a recording medium 200, a recording medium slot 201, a recording medium slot cover 202, and an optical viewfinder 210. The operating unit 70 is comprised of a zoom lever 70a, a menu button 70b, and buttons consisting of a delete button, a SET button, a display button, four direction buttons (up, down, right, left buttons) placed in the form of a cross, and a wheel.

The display unit 28 is, for example, a liquid crystal display and displays image data stored in the recording medium 200 and touch-panel type operating buttons. The mode selector switch 60 switches the digital camera 100 to any of a plurality of operating modes including a shooting mode, a reproducing mode, and a video shooting mode. It should be noted that the shooting mode and the video shooting mode further include a plurality of modes. The operating unit 70 accepts an operation by a user, and the power switch 72 to selectively turn on or off the power. The connecting cable 111 connects the digital camera 100 and an external device to each other, and the connector 112 connects the connecting cable 111 and the digital camera 100 to each other.

The recording medium 200 is a memory card, a hard disk, or the like, and the recording medium slot 201 receives the recording medium 200. The optical viewfinder 210 is for use when a user sees a subject or checks the angle of view.

Figure 2:
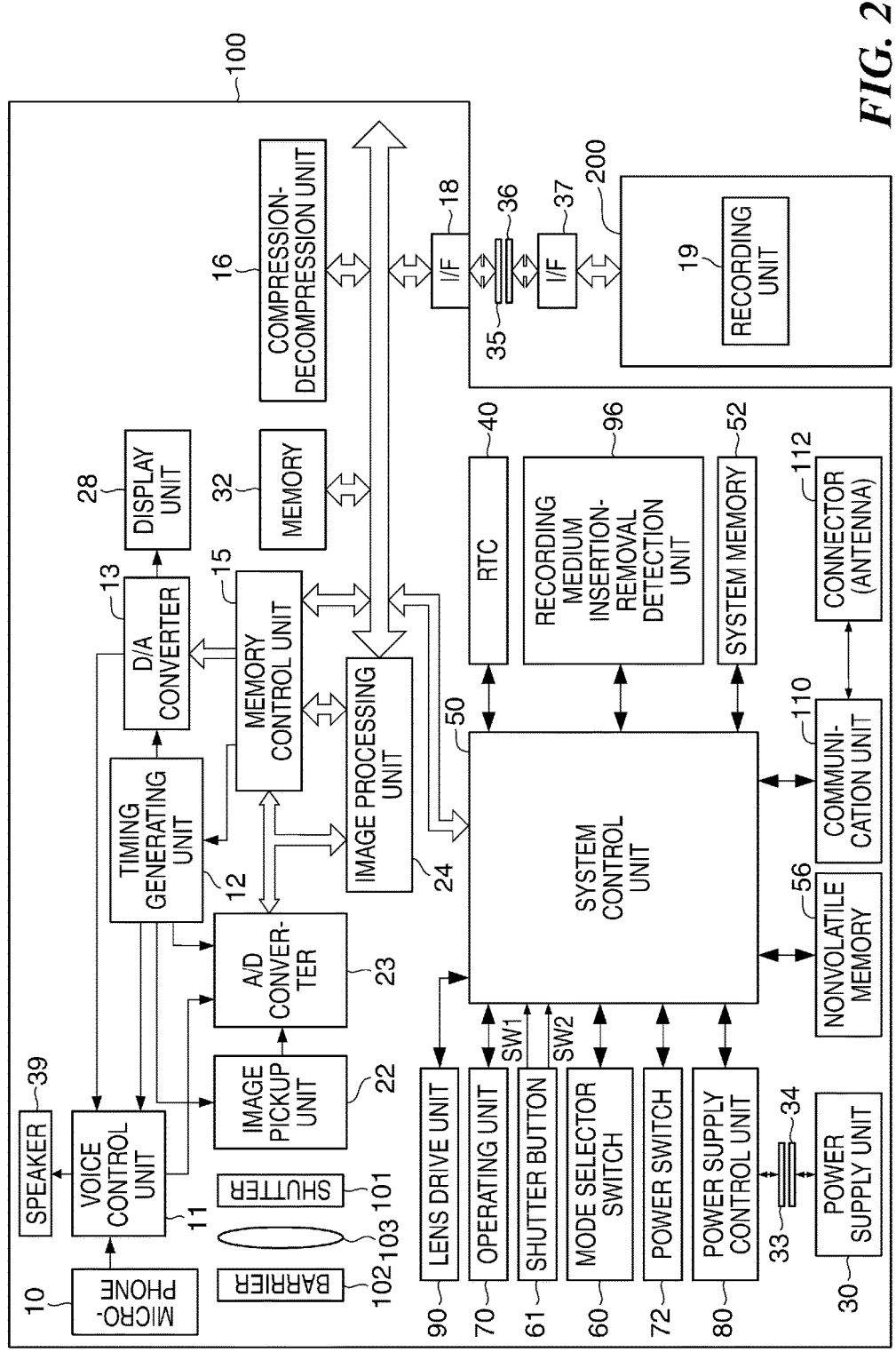
FIG. 2 is a block diagram schematically showing an internal arrangement of the digital camera in FIG. 1.

FIG. 2 is a block diagram schematically showing an internal arrangement of the digital camera 100 in FIG. 1.

Referring to FIG. 2, the digital camera 100 has a microphone 10, a voice control unit 11, a timing generating unit 12, a D/A converter 13, a memory control unit 15, a compression-decompression unit 16, an interface 18, an image pickup unit 22, an A/D converter 23, an image processing unit 24, the display unit 28, a power supply unit 30, a memory 32, connectors 33 and 34, a speaker 39, an RTC (real-time clock) 40, a system control unit 50, a system memory 52, a nonvolatile memory 56, the mode selector switch 60, the shutter button 61, the operating unit 70, the power switch 72, a power control unit 80, a lens drive unit 90, a recording medium insertion-removal detector 96, a shutter 101, a barrier 102, taking lenses 103 including at least one focus lens and one zoom lens, a communication unit 110, and the connector (an antenna for wireless communication) 112. Referring to FIG. 2, the recording medium 200 also has a recording unit 19, connectors 35 and 36, and an interface 37.

A voice signal output from the microphone 10 is input to the A/D converter 23 via the voice control unit 11 comprised of an amplifier or the like, converted into a digital signal by the A/D converter 23, and then stored in the memory 32 via the memory control unit 15.

The voice control unit 11 stores voice data, which is stored in the recording medium 200, in the memory 32, then converts the voice data into an analog signal using the D/A converter 13, and drives the speaker 39 to output voice.

The timing generating unit 12 is controlled by the memory control unit 15 and the system control unit 50 and supplies clock signals and control signals to the voice control unit 11, the D/A converter 13, the image pickup unit 22, and the A/D converter 23. The D/A converter 13 converts data for image display stored in the memory 32 into an analog signal and supplies the analog signal to the display unit 28.

The compression-decompression unit 16 carries out a compression process and a decompression process on a picked-up image and a compressed image, respectively, which are stored in the memory 32, through adaptive discrete cosine transform (ADCT) or the like and stores the processed image data in the memory 32. The image data stored in the memory 32 is put together into a file by the system control unit 50 and stored in the recording medium 200 via the interface 18.

The interface 18 connects the digital camera 100 and the recording medium 200 to each other. The image pickup unit 22 is comprised of a CCD, a CMOS device, or the like, which converts an optical image into an electric signal. The A/D converter 23, which converts an analog signal into a digital signal, is for use in converting an analog signal output from the image pickup unit 22 into a digital signal and in converting an analog signal output from the voice control unit 11 into a digital signal. Output data from the A/D converter 23 is stored in the memory 32 through the image processing unit 24 and the memory control unit 15 in sequence or directly through the memory control unit 15.

The image processing unit 24 carries out a predetermined resizing process such as pixel interpolation or reduction and a predetermined color conversion process on data from the A/D converter 23 or data from the memory control unit 15. The image processing unit 24 also carries out a predetermined computation process using image data obtained by image pickup, and the system control unit 50 provides exposure control and distance measurement control based on the obtained computation result. As a result, TTL (through the lens) AF (auto focus) processing, AE (auto exposure) processing, and EF (pre-flash light emission) processing are performed. Further, the image processing unit 24 carries out a predetermined computation process using image data obtained by image pickup and performs TTL AWB (auto white balance) processing based on the obtained computation result.

The display unit 28 produces displays according to analog signals from the D/A converter 13. For example, image data for display stored in the memory 32 is displayed on the display unit 28 via the D/A converter 13. It should be noted that the digital camera 100 should not always have the display unit 28, but the digital camera 100 has only to be capable of being connected to an internal or external display device and have at least a display control function of controlling display on the display device. The power supply unit 30 is comprised of a primary battery such as an alkali battery or a lithium battery, a secondary battery such as a NiCd battery, a NiMH battery, or a Li battery, an AC adapter, and so on.

The memory 32 stores image data obtained by converting an analog signal output from the image pickup unit 22 into a digital signal and image data which is to be displayed on the display unit 28. The memory 32 also stores voice data recorded by the microphone 10, still images, and moving images as well as file headers of image files. Further, the memory 32 temporarily stores data displayed on the display unit (video memory) and has a storage capacity large enough to store a predetermined number of still images or a predetermined time period of moving images and voice.

The connectors 33 and 34 connect the power supply unit 30 and the power supply control unit 80 to each other. The RTC 40 clocks date and time. The RTC 40 has a power supply unit therein aside from the power supply control unit 80 so that even when supply of electricity by the power supply unit 30 is ceased, the RTC 40 can continue clocking.

The connectors 35 and 36 are for connecting the recording medium 200 and the interface 18 with each other. The recording medium insertion-removal detection unit 96 detects whether or not the recording medium 200 is connected to the connectors 35 and 36.

The system control unit 50 controls the entire digital camera 100. The system control unit 50 also executes programs stored in the nonvolatile memory 56 to carry out processes, to be described later, according to the embodiment of the present invention. Further, the system control unit 50 obtains date and time clocked by the RTC 40 and provides timer control by programming a system timer.

The system memory 52 is a RAM, on which constants and variables for use in operation of the system control unit 50, programs read out from the nonvolatile memory 56, and so on are expanded. The nonvolatile memory 56, which is an electrically erasable programmable memory such as EEPROM, stores constants for use in operation of the system control unit 50, programs for executing various flowcharts, to be describe later, and so on.

The mode selector switch 60 and the operating unit 70 constitute an operating unit for inputting various operational instructions to the system control unit 50.

In accordance with operation on the mode selector switch 60, an operating mode applied to the digital camera 100 is set. When a shooting mode is selected from among operating modes, one of a plurality of modes which the shooting mode has, for example, an auto shooting mode, an auto scene determination mode, a manual mode, a various scene mode in which settings for shooting are configured for respective shooting scenes, a program AE mode, and a custom mode is set by operating the operating unit 70. The operating modes and the shooting modes may be selected using the mode selector switch 60 or selected using any other operating member.

The shutter button 61 generates a first shutter switch signal SW1 when pressed halfway (what is called a half-press state) and generates a second shutter switch signal SW2 when pressed all the way down (what is called a full-press state).

When generation of the first shutter switch signal SW1 is detected, the system control unit 50 starts an operation such as AF processing, AE processing, AWB processing, or EF processing. When generation of the second shutter switch signal SW2 is detected, the system control unit 50 starts a sequence of image pickup operations leading from readout of a signal from the image pickup unit 22 to storage of image data in the recording medium 200.

When any of the buttons constituting the operating unit 70 is depressed, the system control unit 50 performs a function corresponding to the depressed button. For example, when the menu button 70b is depressed, a shooting/setting screen is displayed on the display unit 28.

The power supply control unit 80 is comprised of a battery detection circuit, a DC-DC converter, a switch circuit which switches blocks to be energized, and so on. The power supply control unit 80 detects the presence or absence of a battery mounted, battery type, and remaining battery level, and based on the result of the detection and an instruction from the system control unit 50, the power supply control unit 80 controls the DC-DC converter and supplies required voltage to parts including the recording medium 200.

The barrier 102 covers the image pickup unit 22 to prevent an image pickup system including the lenses 103, the shutter 101 having a diaphragm function, and the image pickup unit 22 from becoming soiled and damaged.

The communication unit 110 is an interface for connecting the digital camera 100 to external devices, and uses various communication schemes such as RS232C, USB, IEEE1394, P1284, SCSI, modem, LAN, and wireless communication.

The connector 112 is for connecting the digital camera 100 to other devices via the communication unit 110 and serves as an antenna during wireless communication. The recording medium 200 has the recording unit 19 comprised of a semiconductor memory, a magnetic disk, or the like, and the recording unit 19 connects to the digital camera 100 via the connectors 35 and 36 and the interface 37.

Figure 3A:
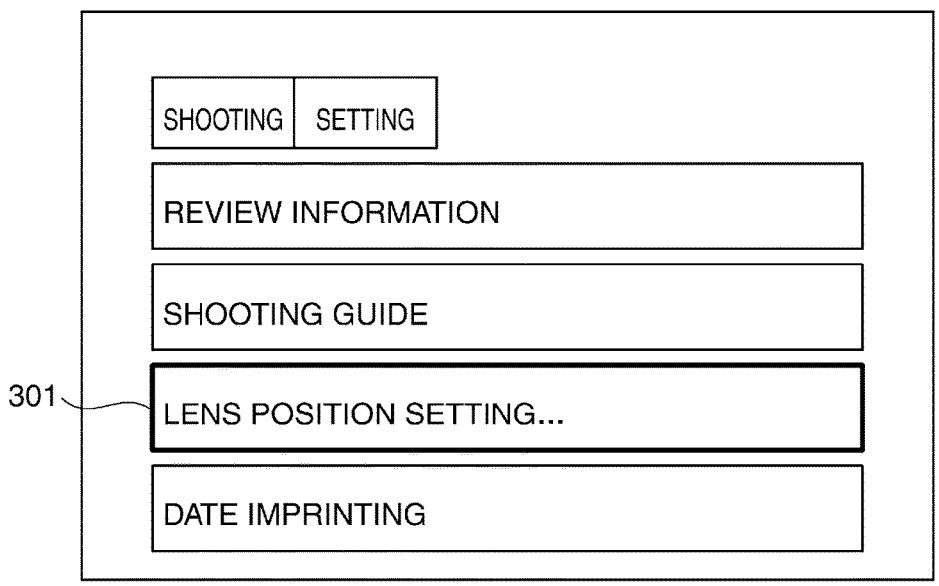
FIGS. 3A to 3C are views useful in explaining a lens position setting screen which is displayed on a display unit in FIG. 1.
Figure 3B:
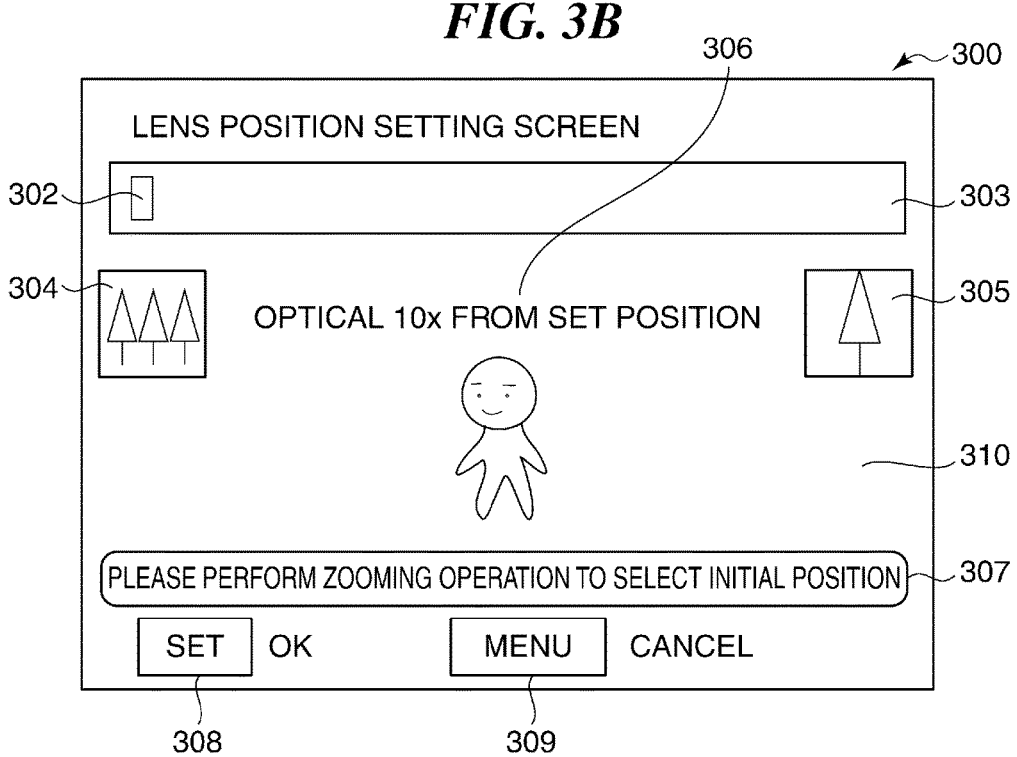
Figure 3C:
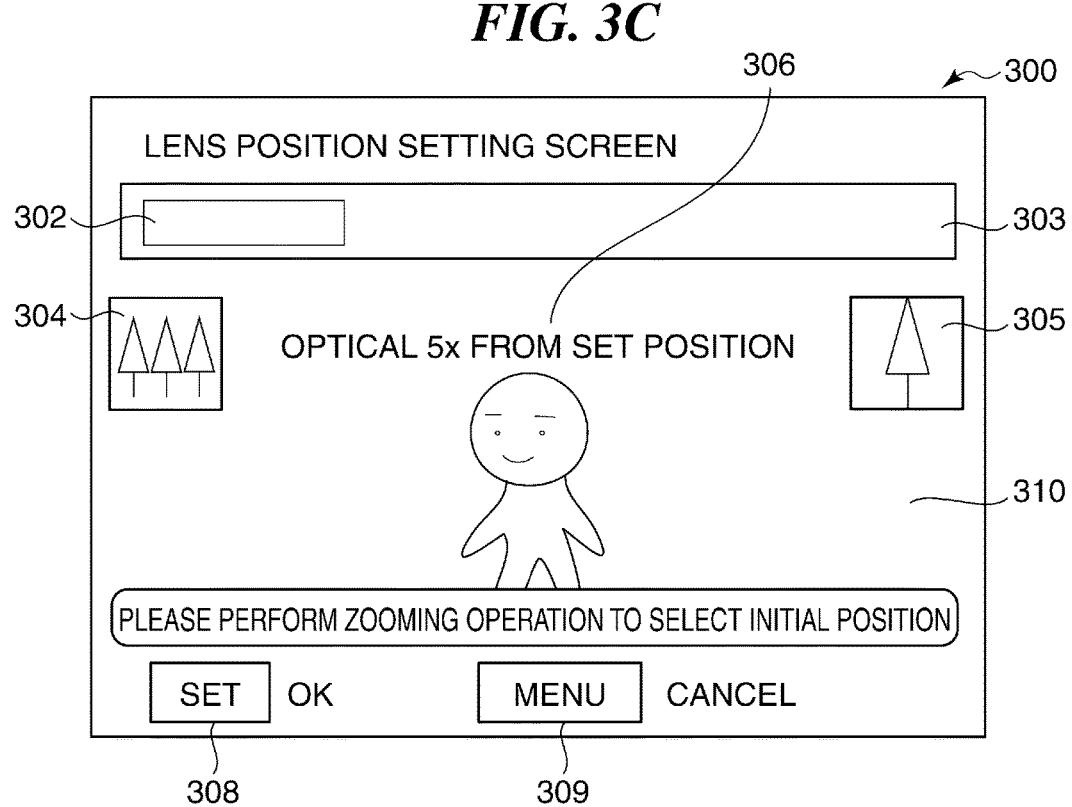

FIGS. 3A to 3C are views useful in explaining a lens position setting screen 300 which is displayed on the display unit 28 in FIG. 1.

FIG. 3A shows an exemplary shooting/setting screen displayed on the display unit 28 when the menu button 70b in FIG. 1 is depressed, and the shooting/setting screen in FIG. 3A includes a lens position setting button 301. When the lens position setting button 301 is depressed, the lens position setting screen 300 is displayed (FIG. 3B). A zoom bar 302, a zoom bar display section 303, a wide-angle end icon 304 (first display item), a telephoto end icon 305 (second display item), a zoom ratio 306, a dialogue 307, an OK button 308, and a cancel button 309 are displayed in a manner being superimposed on a through image 310, which is displayed during through display, on the lens position setting screen 300. Through display means that an image being picked up by the image pickup unit 22 is displayed on the display unit 28 in substantially real time.

The zoom bar 302 indicates a lens position of the zoom lens in an optical zoom range, and the zoom bar 302 is displayed in the zoom bar display section 303. It should be noted that an electronic zoom range as well may be additionally displayed in the zoom bar display section 303. The wide-angle end icon 304 is an icon which indicates a wide-angle end of the zoom lens, and the telephoto end icon 305 is an icon which indicates a telephoto end of the zoom lens. In the embodiment of the present invention, it is assumed that the wide-angle end icon 304 and the telephoto end icon 305 indicate a wide-angle end and a telephoto end in the optical zoom range, but a telephoto end may be a telephoto end in the electronic zoom range.

The zoom ratio 306 shows a zoom ratio when the lens position is at an optical telephoto end based on a user-desired lens position of the zoom lens set by the user (hereafter referred to as "a customized lens position"). The dialogue 307 shows a message for the user, and referring to FIG. 3B, a request to set a customized lens position by a zooming operation is displayed as a message. The OK button 308 is depressed to determine a customized lens position, and the cancel button 309 is depressed to cancel setting of a customized lens position.

The user performs a zooming operation after the lens position setting screen 300 is displayed, and when the position of the zoom lens reaches a user-desired lens position (FIG. 3C), the zooming operation is stopped, and the OK button 308 is depressed to set a customized lens position. As a result, the customized lens position is set at the user-desired position in the optical zoom range.

In FIG. 3C, a 10× zoom lens capable of zooming with 4.3 mm to 43 mm focal lengths (angle of views equivalent to 24 mm to 240 mm in 35 mm film format) is taken as an example. As can be seen from the lengthened zoom bar 302, a customized lens position is set halfway between the wide-angle end and the telephoto end of optical zooming, not at a focal length of 4.3 mm which is the wide-angle end. In this example, the customized lens position is set at a focal length of 8.6 mm (an angle of view equivalent to 48 mm in 35 mm film format). An indication of "5×" in the zoom ratio 306 shows 5× optical zoom up to a focal length of 43 mm (an angle of view equivalent to 240 mm in 35 mm film format) which is the telephoto end.

Namely, the user easily understands that even when the digital camera 100 has a 10× zoom lens, only up to 5× zoom in from the present customized lens position is possible. On the other hand, at this customized lens position, zoom out up to ½× (the focal length of 4.3 mm at the wide-angle end) relative to this customized lens position (the focal length of 8.6 mm) is possible.

On the lens position setting screen 300, the zoom ratio 306 at the telephoto end based on the customized lens position is shown, and hence the maximum magnification at which a taken image is enlarged at the customized lens position is easily grasped of, and this enhances usability for a camera user. It should be noted that customized lens positions may be set for respective shooting modes.

Figure 4A:
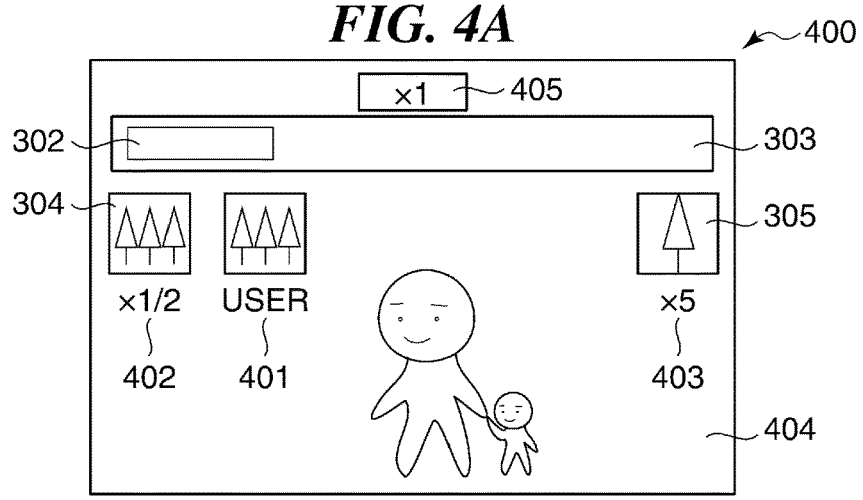
FIGS. 4A to 4C are views useful in explaining a shooting screen which is displayed on the display unit in FIG. 1.
Figure 4B:
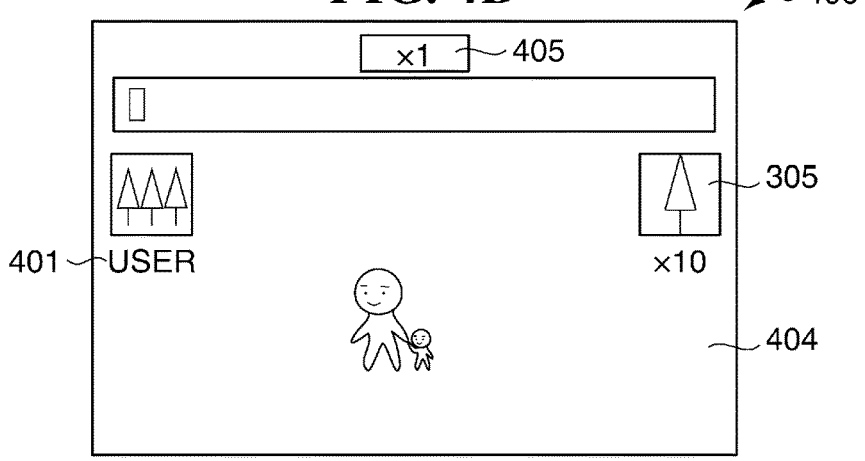
Figure 4C:
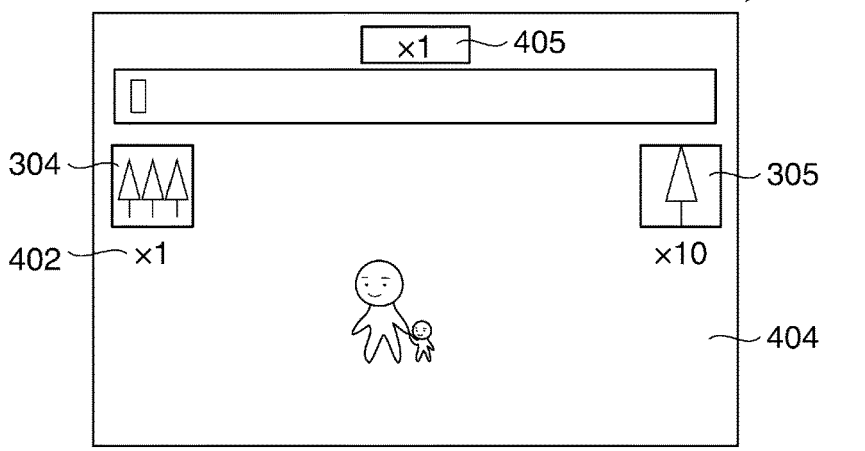

FIGS. 4A to 4C are views useful in explaining a shooting screen 400 which is displayed on the display unit 28 in FIG. 1.

FIG. 4A shows an exemplary display on the shooting screen 400 which is displayed on the display unit 28 in FIG. 1. The zoom bar 302, the zoom bar display section 303, the wide-angle end icon 304, and the telephoto end icon 305 are displayed in a manner being superimposed on a through image 404, which is displayed during through display, on the shooting screen 400 in FIG. 4A as with the lens position setting screen 300 in FIG. 3B. Further, a user icon 401 (third display item), a user-based wide-angle end zoom ratio 402, a user-based telephoto end zoom ratio 403, and a user-based zoom ratio 405 are displayed on the shooting screen 400.

The user icon 401 is an icon which indicates a customized lens position, and the user-based wide-angle end zoom ratio 402 indicates a zoom ratio up to the wide-angle end of the zoom lens where the customized lens position is used as the reference. The user-based telephoto end zoom ratio 403 indicates a zoom ratio up to the telephoto end of the zoom lens where the customized lens position is used as the reference. The user-based zoom ratio 405 indicates a zoom ratio at the customized lens position where the customized lens position is used as the reference.

FIG. 4A shows an exemplary display in a case where for a 10× zoom lens capable of zooming with 4.3 mm to 43 mm focal lengths (angle of views equivalent to 24 mm to 240 mm in 35 mm film format), a customized lens position is set at a focal length of 8.6 mm (an angle of view equivalent to 48 mm in 35 mm film format). At this customized lens position, zoom out up to ½× (a focal length of 4.3 mm at the wide-angle end) relative to this customized lens position (a focal length of 8.6 mm) is possible.

Therefore, "½" is indicated as the user-based wide-angle end zoom ratio 402. This shows that when the user is performing shooting at the customized lens position, and a subject does not fits inside a shooting range, there is a possibility of the user placing the whole of a desired subject within an angle of view by zooming out on the spot without moving to change a shooting position.

When the wide-angle end icon 304 or the telephoto end icon 305 is superimposed on the user icon 401 (that is, when a customized lens position is set at the wide-angle end or the telephoto end), it is only necessary to display it. For example, FIGS. 4B and 4C show a case where the wide-angle end icon 304 is superposed on the user icon 401.

FIGS. 4B and 4C show exemplary displays produced in a case where for a 10× zoom lens capable of zooming with 4.3 mm to 43 mm focal lengths (angle of views equivalent to 24 mm to 240 mm in 35 mm film format), a customized lens position is set at a focal length of 4.3 mm (an angle of view equivalent to 24 mm in 35 mm film format). Whether to produce the display in FIG. 4B or the display in FIG. 4C may be chosen based on whether or not a customized lens position has been set on the lens position setting screen 300 described above.

Specifically, when the user has set a customized lens position at the wide-angle end on purpose on the lens position setting screen 300, the user icon 401 is displayed at the wide-angle end as shown in FIG. 4B to indicate that the position set by the user is at the wide-angle end. On the other hand, when the user has set no customized lens position on the lens position setting screen 300, and an initial zoom position is at the wide-angle end which is a default value, the wide-angle icon 304 is displayed at the wide-angle end as shown in FIG. 4C.

On the shooting screen 400, the wide-angle end icon 304 indicates the wide-angle end of the lens position, the telephoto end icon 305 indicates the telephoto end of the lens position, and the user icon 401 indicates the customized lens position. This enables the user to visually grasp of the correlation between lens positions and thus enables the user to easily determine a desired lens position.

Moreover, on the shooting screen 400, a zoom ratio at the wide-angle end where the customized lens position is used as the reference (the user-based wide-angle end zoom ratio 402) is displayed, and also, a zoom ratio at the telephoto end where the customized lens position is used as the reference (the user-based telephoto end zoom ratio 403) is displayed. This enables the user to easily grasp of a variable range of zoom ratio where the customized lens position is used as the reference.

Further, on the shooting screen 400, the wide-angle end icon 304 or the telephoto end icon 305 and the user icon 401 are superposed on top of each other, either one is displayed. This prevents the user from being confused since the wide-angle end icon 304 or the telephoto end icon 305 and the user icon 401 are never displayed in a manner being superposed on top of each other.

Figure 5A:
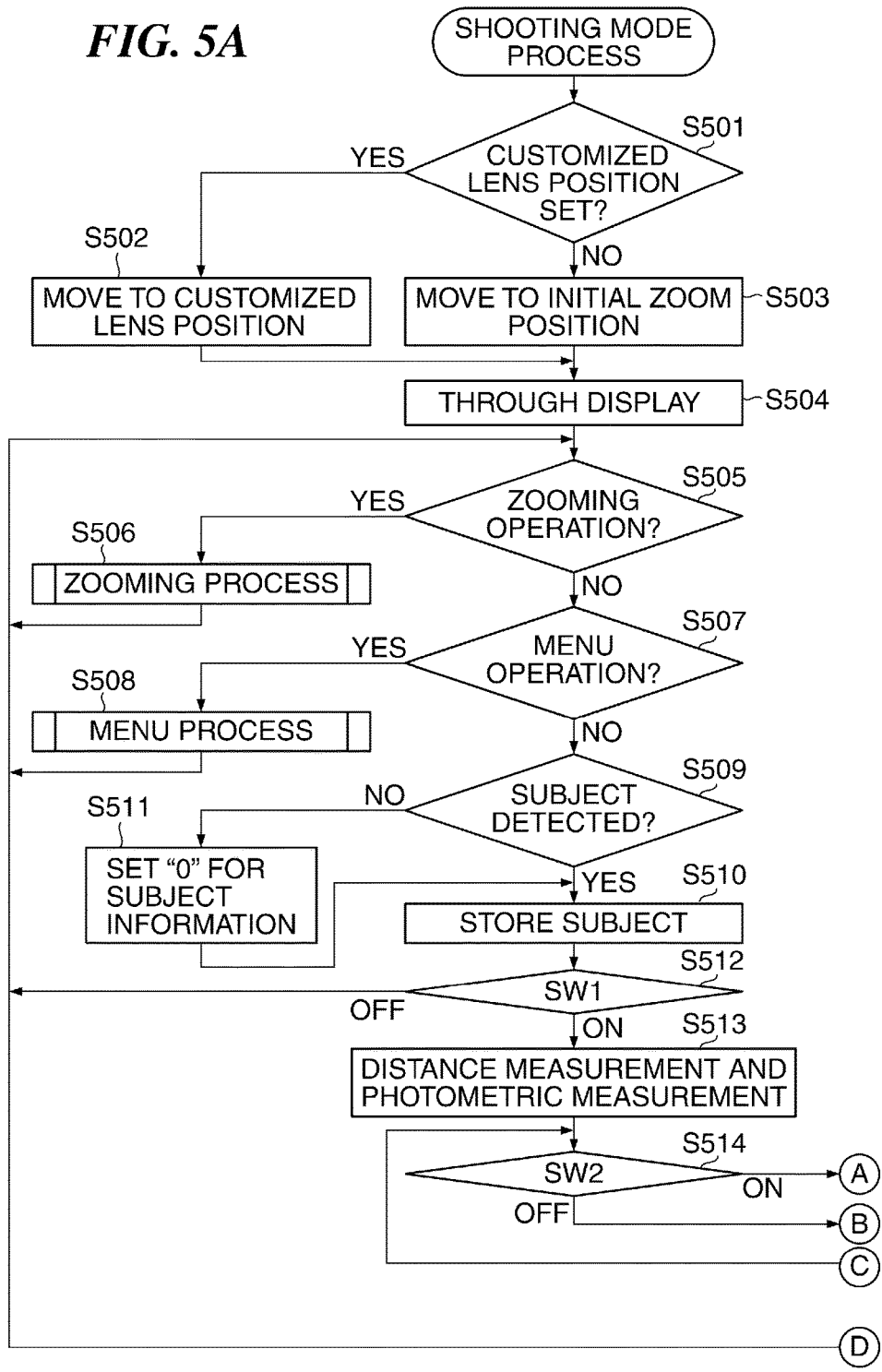
FIGS. 5A and 5B are flowcharts showing a shooting mode process which is carried out by a system control unit in FIG. 2.
Figure 5B:
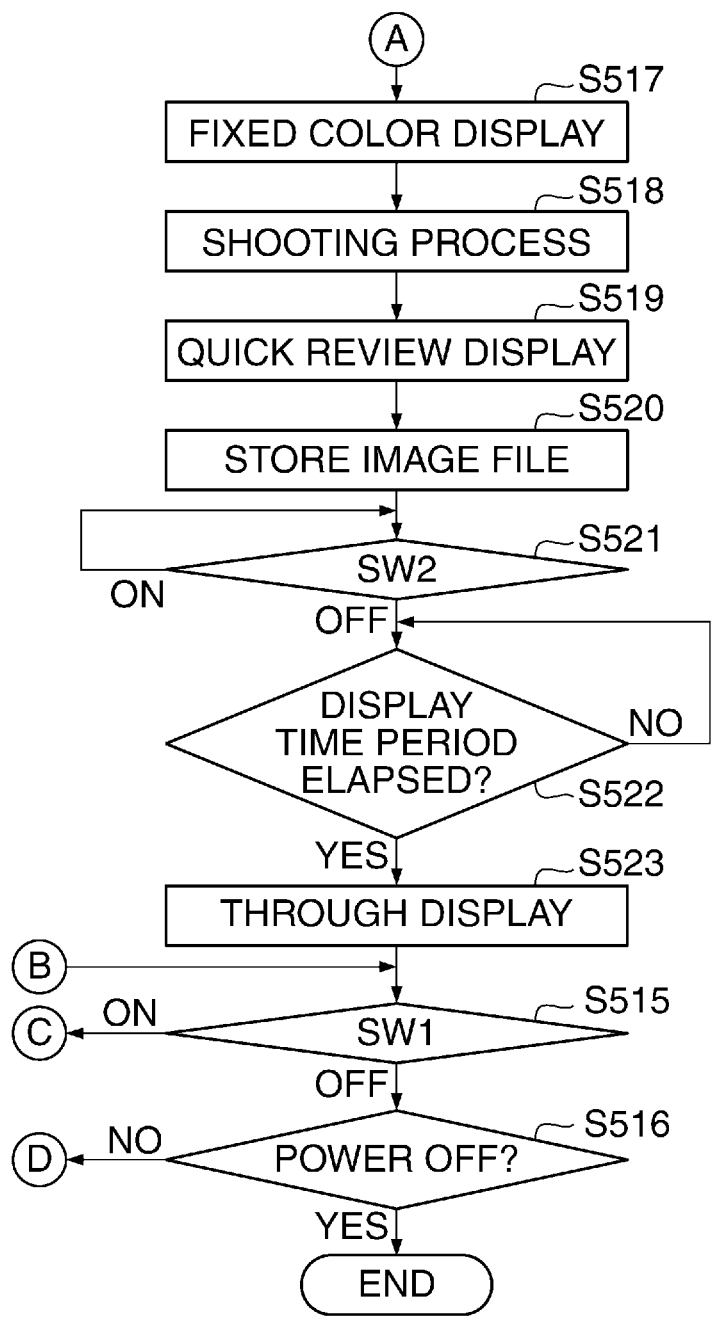

FIGS. 5A and 5B are flowcharts showing a shooting mode process. This process is started when the digital camera 100 is started and placed in shooting mode. The shooting mode process is carried out by the system control unit 50 expanding a program stored in the nonvolatile memory 56 into the system memory 52.

First, in step S501, referring to setting information stored in the nonvolatile memory 56, the system control unit 50 determines whether or not a customized lens position has been set. When the system control unit 50 determines that a customized lens position has been set, the process proceeds to step S502, and when the system control unit 50 determines that no customized lens position has been set, the process proceeds to step S503.

In the step S502, the system control unit 50 controls the lens drive unit 90 to drive and move the zoom lens to the customized lens position read out from the nonvolatile memory 56 (an initial zoom position set by the user). When customized lens positions are set for respective shooting modes, the zoom lens is moved to a customized lens position set for the present shooting mode. Thus, when a customized lens position has been set, an initial zoom position at the start of shooting mode corresponds to a user-desired position.

On the other hand, in the step S503, the system control unit 50 controls the lens drive unit 90 to drive and move the zoom lens to a default initial zoom position. It is assumed that the default initial zoom position is at the wide-angle end. It should be noted that although the default initial zoom position is at the wide-angle end here, this is not limitative, but the default initial zoom position may be another zoom position. For example, the default initial zoom position may be a position at which the difference between a picked-up image and the field of view observed through the optical viewfinder 210 (parallax) is the smallest.

In step S504, the system control unit 50 displays an image being picked up by the image pickup unit 22 on the display unit 28 in live view in substantially real time (through display). Also, as described above with reference to FIGS. 4A to 4C, the system control unit 50 produces a display indicating the customized lens position and the present zoom position in a range from the wide-angle end to the telephoto end. It should be noted that due to initial display at this time point, the customized lens position and the present zoom position correspond to each other.

In step S505, the system control unit 50 determines whether or not an operation on the zoom lever 70a (zooming operation) has been performed. As a result of the determination in the step S505, when the zooming operation has been performed, the system control unit 50 moves the zoom lens by carrying out a zoom process, to be described later with reference to FIG. 6 (step S506), followed by the process returning to the step S505. When the zooming operation has not been performed, the system control unit 50 determines whether or not a menu operation in which the menu button 70b constituting the operating unit 70 has been depressed has been performed (step S507).

As a result of the determination in the step S507, when the menu operation has been performed, the system control unit 50 carries out a menu process, to be described later with reference to FIG. 7, to set a zoom position of the zoom lens (step S508), followed by the process returning to the step S505. When the menu operation has not been performed, the system control unit 50 determines whether or not a specific subject (for example, a human face) has been detected in the image being displayed as a through image (step S509).

As a result of the determination in the step S509, when any specific subject has been detected, the system control unit 50 stores subject information on the subject such as positional coordinates and size (width, height) of the detected subject, number of detected subjects, and reliability coefficient in the system memory 52 (step S510). On the other hand, when no specific subject has been detected, the system control unit 50 sets zero for subject information such as positional coordinates and size (width, height) of a subject, number of detected subjects, and reliability coefficient (step S511) and stores this information in the system memory 52 (step S510).

The system control unit 50 then determines whether or not the first shutter switch signal SW1 has been generated (step S512). When the first shutter switch signal SW1 has not been generated, the process returns to the step S505, and when the first shutter switch signal SW1 has been generated, the system control unit 50 carries out a distance measurement process in which it measures the distance to the subject and causes the focus lens to focus on the subject (auto focus) and carries out a photometric measurement process in which it measures the brightness of the subject and determines an aperture value and a shutter speed to prepare for shooting (step S513) and determines whether or not the second shutter switch SW2 has been generated (step S514).

As a result of the determination in the step S514, when the second shutter switch signal SW2 has not been generated, the system control unit 50 determines whether or not the first shutter switch signal SW1 has been generated (step S515). As a result of the determination in the step S515, when the first shutter switch signal SW1 has been generated, the process returns to the step S514. As a result, the focus lens keeps focusing on the subject in the state where the shutter button 61 is pressed halfway, and hence the user is allowed to immediately start a shooting operation. On the other hand, as a result of the determination in the step S515, when the first shutter switch signal SW1 has not been generated, the system control unit 50 then determines whether or not an instruction to turn off the power switch 72 has been issued (step S516).

As a result of the determination in the step S516, when no instruction to turn off the power switch 72 has been issued, the process returns to the step S505, and when an instruction to turn off the power switch 72 has been issued, the present process is terminated.

On the other hand, as a result of the determination in the step S514, when the second shutter switch signal SW2 has been generated, the system control unit 50 brings the display unit 28 into a fixed color display state in, for example, solid black (step S517). The system control unit 50 carries out a shooting process in which it stores image data obtained by way of the image pickup unit 22 and the A/D converter 23 in the memory 32 via the memory control unit 15, reads out an image stored in the memory 32, and visualizes this image (step S518).

The system control unit 50 then displays image data, which has been obtained by carrying out the shooting process, on the display unit 28 until a time period set in advance has elapsed (quick review display) (step S519), stores the image data as an image file in the recording medium 200 (step S520), and determines whether or not the second shutter switch signal SW2 has been generated (step S521).

As a result of the determination in the step S521, when the second shutter switch signal SW2 has not been generated, the system control unit 50 continues quick review display, and when the second shutter switch signal SW2 has been generated, the system control unit 50 determines whether or not a quick review display time period set in advance has elapsed (step S522).

As a result of the determination in the step S522, when the display time period has not elapsed, the system control unit 50 stands by until the display time period has elapsed, and when the display time period has elapsed, the system control unit 50 switches from quick review display to through display (standby for shooting) (step S523), followed by the process proceeding to the step S515.

It should be noted that the present process is terminated when the shooting mode is switched to another mode using the mode selector switch 60 as well as when an instruction to turn off the power switch 72 is issued in the step S516.

Figure 6:
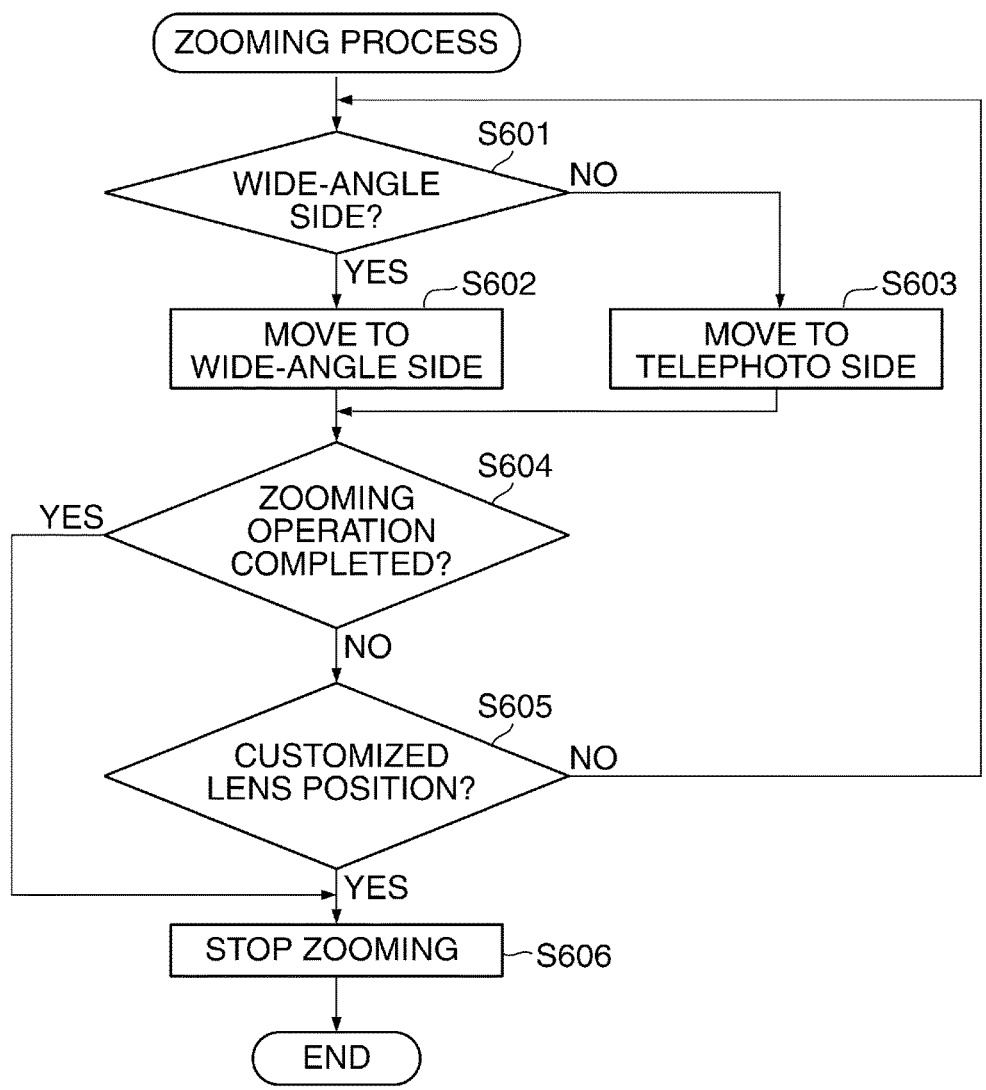
FIG. 6 is a flowchart showing the procedure of a zooming process which is carried out in step S506 in FIG. 5A.

FIG. 6 is a flowchart showing the procedure of the zoom process which is carried out in the step S506 in FIG. 5A. The process in FIG. 6 is carried out by the system control unit 50 expanding a program stored in the nonvolatile memory 56 into the system memory 52.

Referring to FIG. 6, the system control unit 50 determines whether or not a zooming operation has been performed toward the wide-angle side (step S601). As a result of the determination in the step S601, when the zooming operation has been performed toward the wide-angle side, the system control unit 50 moves the zoom lens toward the wide-angle side (step S602), and on the other hand, when the zooming operation has not been performed toward the wide-angle side (the zooming operation has been performed toward the telephoto side), the system control unit 50 moves the zoom lens toward the telephoto side (step S603).

Then, in step S604, the system control unit 50 determines whether or not the zooming operation has been completed. The completion of the zooming operation means, for example, release of the zoom lever 70a (termination of the operation on the zoom lever 70a). When the zoom lever 70a has been released, the process proceeds to step S606 in which the system control unit 50 stops moving the zoom lens (stops zooming). When the zoom lever 70a has not been released, the process proceeds to step S605.

Although in the example described above, a zooming operation is performed using the zoom lever 70a, a zooming operation should not always be performed in this manner but may be performed by depressing a zoom button or touching a touch panel.

For example, in a case where a zoom button is depressed, the zoom position shifts as long as the zoom button is depressed at positions other than the wide-angle end, the telephoto end, and the customized lens position. The user should check the through image 310 and release the zoom button when a desired zoom position is obtained. Also, in a case where the zoom position is changed by continuously depressing the zoom button, the system control unit 50 may determine in the step S605 whether or not a predetermined time period (about several 100 sec) has elapsed since depression of the zoom button was stopped, and when the predetermined time period has elapsed, the system control unit 50 may determine that a zooming operation has been completed, followed by the process proceeding to the step s606.

In the step S605, the system control unit 50 determines whether or not the zoom position has reached the customized lens position. When the zoom position has reached the customized lens position, the process proceeds to step S606 in which the system control unit 50 stops driving the zoom lens responsive to the zooming operation (this will hereafter referred to as "zoom drive"), and when the zoom position has not reached the customized lens position, the process returns to the step S601 in which the system control unit 50 continues zoom drive. Namely, when the zoom position has reached the customized lens position as a result of zoom drive, the system control unit 50 stops zoom drive even when the operation on the zoom lever 70*a* has not been terminated (even when the user has not released the zoom lever 70*a*).

After zooming stops at the customized lens position, the operation on the zoom lever 70*a* is terminated once, and then the zoom lever 70*a* is moved in the same direction again to do zoom drive toward the wide-angle side or the telephoto side astride the customized lens position.

As described above, since zoom drive is stopped at the customized lens position even when a zooming operation is under way, the user can easily adjust the zoom position to a customized lens position which he or she registered without making fine zoom adjustments. As a result, an operation in which the zoom position is moved from the customized lens position toward the telephoto side by zooming up and an operation in which the zoom position is put back to the customized lens position are quickly performed with ease. Namely, the zoom position is quickly shifted with ease between the customized lens position and the telephoto side.

Also, an operation in which the zoom position is moved from the customized lens position toward the wide-angle side by zooming out and an operation in which the zoom position is put back to the customized lens position are quickly performed with ease. Namely, the zoom position is quickly shifted with ease between the customized lens position and the wide-angle side. Thus, the user is allowed to perform shooting using the customized lens position as a base zoom position.

It should be noted that in the example described above, when the zoom position has reached the customized lens position as a result of zoom drive, zoom drive is stopped, and the operation on the zoom lever 70*a* is terminated once even when the operation on the zoom lever 70*a* has not been terminated (even when the user has not released the zoom lever 70*a*), and zooming astride the customized lens position is not allowed to be performed unless the operation on the zoom lever 70*a* is started again, the zooming operation is not limited to this. For example, when the zoom position has reached the customized lens position, zoom drive may be stopped, and even after zoom drive is stopped, zooming astride the customized lens position is allowed to be performed by continuously operating the zoom lever 70*a* without releasing it for a predetermined time period (about several seconds).

Moreover, although in the above-described example according to the embodiment of the present invention, it is determined in the step S605 whether or not the zoom position has reached the customized lens position irrespective of whether the zooming operation is an operation toward the wide-angle side (zoom out) or an operation toward the telephoto side (zoom in), and when the zoom position has reached the customized lens position, zoom drive is stopped, zoom drive should not always be stopped in this manner. Only when an operation toward the wide-angle side (zoom out) or an operation toward the telephoto side (zoom in) is performed, the zoom position may be fixed at the customized lens position.

For example, when the zoom position reaches the customized lens position as a result of an operation from the telephoto side of the customized lens position toward the wide-angle side (zoom out), zoom drive is stopped. On the other hand, when the zoom position reaches the customized lens position as a result of an operation from the wide-angle side of the customized lens position toward the telephoto side (zoom in), zoom drive is not stopped but is continued to enable zoom in to the telephoto side of the customized lens position. This facilitates the operation in which the zoom position is brought back from the telephoto side to the customized lens position, and on the other hand, when zoom in at one stroke from the wide-angle side is desired, zoom in with good operability is possible.

Further, although in the example described above, one customized lens position is registered, different customized lens positions may be set for respective ones of multiple shooting modes. For example, a scene mode which is a shooting mode includes a firework mode in which fireworks are shot in vivid colors and a snap shot mode in which a person is shot in a room. The user is allowed to set different customized lens positions for the firework mode and the snap shot mode, and for example, configure settings described hereafter. In the firework mode, fireworks exploding in the night sky are shot, and hence customized lens position is set on a slightly telephoto side. On the other hand, in the snap shot mode, a customized lens position is set on a wide-angle side so that many people in a narrow room can be inside a shooting range.

Figure 7:
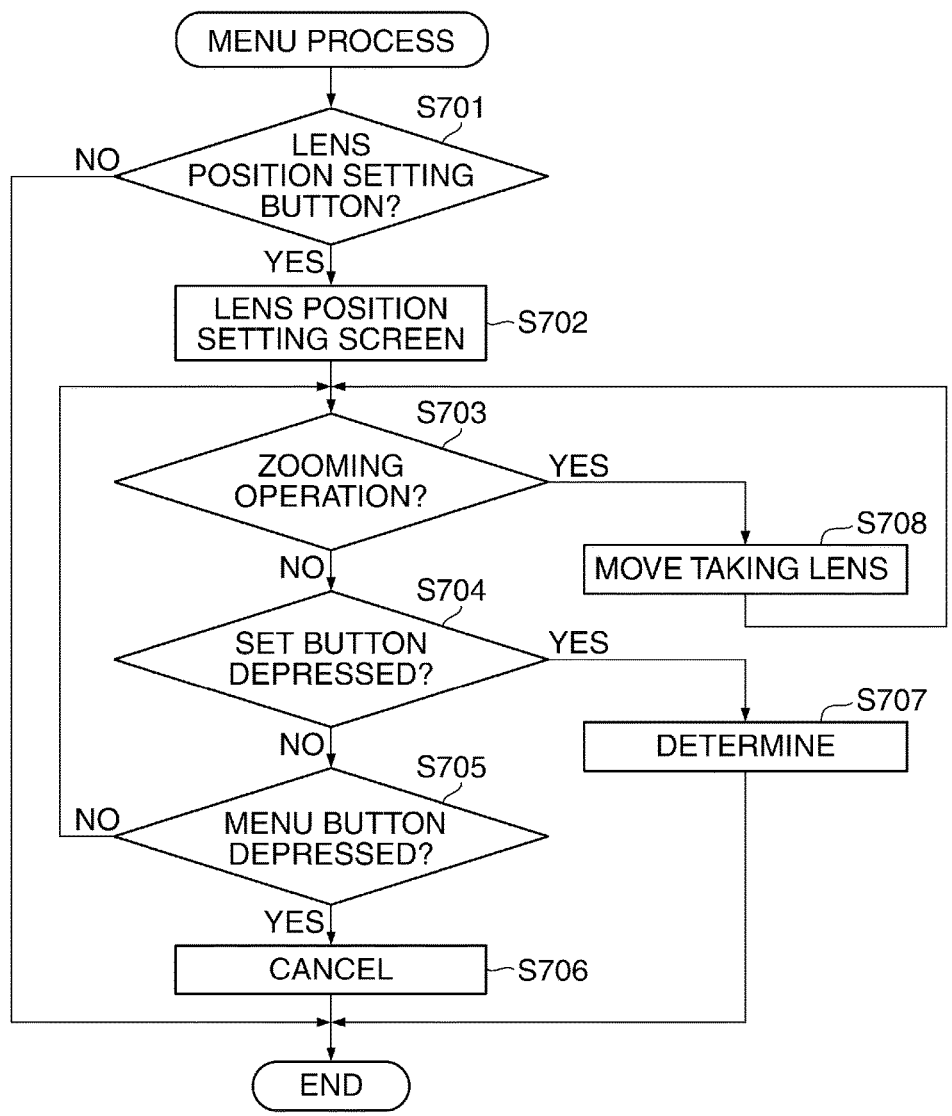
FIG. 7 is a flowchart of a menu process which is carried out in step S508 in FIG. 5A.

FIG. 7 is a flowchart of the menu process which is carried out in the step S508 in FIG. 5A. The process in FIG. 7 is carried out by the system control unit 50 expanding a program stored in the nonvolatile memory 56 into the system memory 52.

Referring to FIG. 7, when the menu button 70*b* is depressed, a shooting/setting screen (FIG. 3A) through which various settings are allowed to be configured is displayed on the display unit 28, and the system control unit 50 determines whether or not the lens position setting button 301 on the displayed shooting/setting screen has been depressed (step S701).

As a result of the determination in the step S701, when the lens position setting button 301 has not been depressed, the present process is immediately terminated, and when the lens position setting button 301 has been depressed, the lens position setting screen 300 (FIG. 3B) is displayed on the display unit (step S702), and a zooming operation for determining a customized lens position is being performed (step S703).

As a result of the determination in the step S703, when the zooming operation is being performed, the zooming operation is continued until the zoom lens has moved to a user-desired lens position (step S708). At this time, the user moves the zoom lever 70*a* while seeing the lens position setting screen 300. On the other hand, as a result of the determination in the step S703, when the zooming operation is not being performed (the zooming operation has been terminated), the system control unit 50 determines whether or not the set button has been depressed (step S704).

As a result of the determination in the step S704 when the set button has been depressed, the system control unit 50 determines a lens position at which the zoom lens upon depression of the set button as a customized lens position (step S707) and terminates the present process. On the other hand, when the set button has not been depressed, the system control unit 50 determines whether or not the menu button 70b has been depressed (step S705).

As a result of the determination in the step S705, when the menu button 70b has been depressed, the system control unit 50 cancels setting of a customized lens position (step S706) and terminates the present process. On the other hand, as a result of the determination in the step S705, when the menu button 70b has not been depressed, the process returns to the step S703.

According to the process in FIG. 7, since the user sets a customized lens position while seeing the lens position setting screen 300 (step S708), a user-desired lens position is set as a customized lens position, and as a result, a zoom position directly reflecting an intention of the user is set.

Referring to FIG. 7, the menu process in which the user sets a customized lens position has been described, but in a case where a customized lens position is not set in this process, a lens position corresponding to a zoom ratio frequently used by the user may be selected from operation logs accumulated in the digital camera 100 and set as a customized lens position. Namely, at the time of shooting, the user is likely to desire a lens position which he or she frequently uses, and hence setting a customized lens position based on a lens position which the user frequently uses enhances usability for the user of the camera.

To implement the embodiment of the present invention, overall control of the apparatus (the digital camera 100) may be exercised by a single piece of hardware (for example, the system control unit 50) or may be shared by a plurality of pieces of hardware.

Although in the embodiment described above, the present invention is applied to the digital camera 100 by way of example, the apparatus to which the present invention is applied is not limited to this, but the present invention may be applied to equipment having an image pickup unit, for example, a PC, a PDA, a cellular phone terminal, a tablet, a music player, a game machine, and an electronic book reader.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-111059, filed May 29, 2014, which is hereby incorporated by reference herein in its entirety.

What is claimed is:

1. An electronic apparatus comprising:
a memory and at least one processor which function as units comprising:
a zooming operation unit configured to accept a zooming operation by a user in which a zoom position of a taking lens is changed; and
a control unit configured to provide control to, in response to start of the zooming operation, start shifting the zoom position, and in response to termination of the zooming operation, stop shifting the zoom position,
wherein when the zoom position reaches a predetermined zoom position which (1) is inside an optical zoom range and (2) is neither an optical wide-angle end nor an optical telephoto end while said control unit is shifting the zoom position in a first direction in response to a first zooming operation by a user for shifting the zoom position in the first direction, said control unit provides control to fix the zoom position at the predetermined zoom position even when the first zooming operation by the user has not been terminated, and after that, said control unit provides control to shift the zoom position further in the first direction from the predetermined zoom position (a) in response to the first zooming operation being terminated once and the first zooming operation being started again and/or (b) in response to the first zooming operation having been continued for a predetermined time period or longer without being terminated.

2. The electronic apparatus according to claim 1, wherein when the zoom position reaches the predetermined zoom position while said control unit is shifting the zoom position in the first direction in response to the first zooming operation, said control unit provides control to fix the zoom position at the predetermined zoom position even when the first zooming operation has not been terminated, and after that, in response to the first zooming operation being terminated once and the first zooming operation being started again, said control unit provides control to shift the zoom position further in the first direction from the predetermined zoom position.

3. The electronic apparatus according to claim 1, wherein when the zoom position reaches the predetermined zoom position while said control unit is shifting the zoom position in the first direction in response to the first zooming operation, said control unit provides control to fix the zoom position at the predetermined zoom position even when the first zooming operation has not been terminated, and after that, in response to the first zooming operation having been continued for a predetermined time period or longer without being terminated, said control unit provides control to shift the zoom position further in the first direction from the predetermined zoom position.

4. The electronic apparatus according to claim 1, wherein when the zoom position reaches the predetermined zoom position while said control unit is shifting the zoom position in a second direction opposite to the first direction in response to a second zooming operation for shifting the zoom position in the second direction, said control unit provides control not to fix the zoom position at the predetermined zoom position but to shift the zoom position further in the second direction when the second zooming operation has not been terminated and has been continued.

5. The electronic apparatus according to claim 4, wherein the first direction is a direction in which the zoom position shifts from a telephoto side to a wide-angle side, and the second direction is a direction in which the zoom position shifts from the wide-angle side to the telephoto side.

6. The electronic apparatus according to claim 1, wherein in starting a shooting mode, said control unit provides control such that the zoom position corresponds to the predetermined zoom position.

7. The electronic apparatus according to claim 1, wherein the memory and the at least one processor further function as a setting unit configured to set the predetermined zoom position according to operation of a user.

8. The electronic apparatus according to claim 1, wherein the memory and the at least one processor further function as a setting unit configured to set the predetermined zoom position based on a frequently used zoom position in user operation logs.

9. The electronic apparatus according to claim 1, wherein the memory and the at least one processor further function as a shooting mode setting unit configured to set one shooting mode selected from a plurality of shooting modes, and wherein the predetermined zoom position varies with shooting modes.

10. The electronic apparatus according to claim 1, wherein at least one of the following is displayed on a display unit: (1) a magnification from the predetermined zoom position to the optical telephoto end and (2) a magnification from the predetermined zoom position to the optical wide-angle end.

11. The electronic apparatus according to claim 1, wherein a magnification from the predetermined zoom position to a present zoom position is displayed on a display unit.

12. The electronic apparatus according to claim 1, wherein a display indicative of a position corresponding to the predetermined zoom position is produced in a bar display area where a bar indicative of a present zoom position in a zoom range is displayed.

13. The electronic apparatus according to claim 12, wherein in the bar display area, a predetermined icon is displayed at a position corresponding to the predetermined zoom position, a wide-angle end icon is displayed at a position corresponding to the optical wide-angle end, and a telephoto end icon is displayed at a position corresponding to the optical telephoto end.

14. The electronic apparatus according to claim 1, further comprising an image pickup unit.

15. An electronic apparatus comprising a memory and at least one processor which function as units comprising:
   a zooming operation unit configured to accept a zooming operation in which a zoom position of a taking lens is changed; and
   a control unit configured to provide control to change the zoom position in response to the zooming operation; and
   a display control unit configured to provide control to display at least one of the following: (1) a first magnification from a predetermined optical zoom position, which (a) is inside an optical zoom range and (b) is neither an optical wide-angle end nor an optical telephoto end, to the optical telephoto end and (2) a second magnification from the predetermined optical zoom position to the optical wide-angle end, wherein both the first magnification and the second magnification are magnifications based on the predetermined optical zoom position regardless of a present zoom position.

16. The electronic apparatus according to claim 15, further comprising an image pickup unit.

17. An electronic apparatus comprising a memory and at least one processor which function as units comprising:
   a zooming operation unit configured to accept a zooming operation in which a zoom position of a taking lens is changed; and
   a control unit configured to provide control to change the zoom position in response to the zooming operation; and
   a display control unit configured to provide control to display a magnification from a predetermined optical zoom position, which (a) is inside an optical zoom range, (b) is neither an optical wide-angle end nor an optical telephoto end, and (c) is independent from a present zoom position, to the present zoom position, wherein the magnification is a magnification based on the predetermined optical zoom position.

18. The electronic apparatus according to claim 17, wherein said display control unit provides control to further display at least one of the following: a magnification from the predetermined optical zoom position to the optical telephoto end and a magnification from the predetermined optical zoom position to the optical wide-angle end.

19. The electronic apparatus according to claim 17, wherein the memory and the at least one processor further function as a control unit configured to provides control such that the zoom position corresponds to the predetermined optical zoom position when a shooting mode is started.

20. The electronic apparatus according to claim 17, wherein the memory and the at least one processor further function as a setting unit configured to set the predetermined optical zoom position according to operation of a user.

21. The electronic apparatus according to claim 17, wherein the memory and the at least one processor further function as a setting unit configured to set the predetermined optical zoom position based on a frequently used zoom position in user operation logs.

22. The electronic apparatus according to claim 17, wherein the memory and the at least one processor further function as a shooting mode setting unit configured to set one shooting mode selected from a plurality of shooting modes, and
   wherein the predetermined optical zoom position varies with shooting modes.

23. The electronic apparatus according to claim 17, wherein said display control unit provides control to produce a display indicative of a position corresponding to the predetermined optical zoom position in a bar display area where a bar indicative of a present zoom position in a zoom range is displayed, and
   wherein in the bar display area, said display control unit displays a predetermined icon at a position corresponding to the predetermined optical zoom position, displays a wide-angle end icon at a position corresponding to the optical wide-angle end, and displays a telephoto end icon at a position corresponding to the optical telephoto end.

24. The electronic apparatus according to claim 17, further comprising an image pickup unit.

25. A control method for an electronic apparatus, the control method comprising:
a zooming operation step of accepting a zooming operation by a user in which a zoom position of a taking lens is changed; and
a control step of providing control to, in response to start of the zooming operation, start shifting the zoom position, and in response to termination of the zooming operation, stop shifting the zoom position,
wherein in said control step, when the zoom position reaches a predetermined zoom position which (1) is inside an optical zoom range and (2) is neither an optical wide-angle end nor an optical telephoto end while the zoom position is being shifted in a first direction in response to a first zooming operation by a user for shifting the zoom position in the first direction, control is provided to fix the zoom position at the predetermined zoom position even when the first zooming operation by the user has not been terminated, and after that, control is provided to shift the zoom position further in the first direction from the predetermined zoom position (a) in response to the first zooming operation being terminated once and the first zooming operation being started again and/or (b) in response to the first zooming operation having been continued for a predetermined time period or longer without being terminated.

26. A control method for an electronic apparatus, the control method comprising:
a zooming operation step of accepting a zooming operation in which a zoom position of a taking lens is changed; and
a control step of providing control to change the zoom position in response to the zooming operation; and
a display control step of providing control to display at least one of the following: (1) a first magnification from a predetermined optical zoom position, which (a) is inside an optical zoom range and (b) is neither an optical wide-angle end nor an optical telephoto end, to the optical telephoto end and (2) a second magnification from the predetermined optical zoom position to the optical wide-angle end, wherein both the first magnification and the second magnification are magnifications based on the predetermined optical zoom position regardless of a present zoom position.

27. A control method for an electronic apparatus, the control method comprising:
a zooming operation step of accepting a zooming operation in which a zoom position of a taking lens is changed; and
a control step of providing control to change the zoom position in response to the zooming operation; and
a display control step of providing control to display a magnification from a predetermined optical zoom position, which (a) is inside an optical zoom range, (b) is neither an optical wide-angle end nor an optical telephoto end, and (c) is independent from a present zoom position, to the present zoom position, wherein the magnification is a magnification based on the predetermined optical zoom position.

28. A non-transitory computer-readable storage medium storing a program for causing a computer to execute a control method for an electronic apparatus, the control method comprising:
a zooming operation step of accepting a zooming operation by a user in which a zoom position of a taking lens is changed; and
a control step of providing control to, in response to start of the zooming operation, start shifting the zoom position, and in response to termination of the zooming operation, stop shifting the zoom position,
wherein in the control step, when the zoom position reaches a predetermined zoom position which (1) is inside an optical zoom range and (2) is neither an optical wide-angle end nor an optical telephoto end while the zoom position is being shifted in a first direction in response to a first zooming operation by a user for shifting the zoom position in the first direction, control is provided to fix the zoom position at the predetermined zoom position even when the first zooming operation by the user has not been terminated, and after that, control is provided to shift the zoom position further in the first direction from the predetermined zoom position (a) in response to the first zooming operation being terminated once and the first zooming operation being started again and/or (b) in response to the first zooming operation having been continued for a predetermined time period or longer without being terminated.

29. A non-transitory computer-readable storage medium storing a program for causing a computer to execute a control method for an electronic apparatus, the control method comprising:
a zooming operation step of accepting a zooming operation in which a zoom position of a taking lens is changed; and
a control step of providing control to change the zoom position in response to the zooming operation; and
a display control step of providing control to display at least one of the following: (1) a first magnification from a predetermined optical zoom position, which (a) is inside an optical zoom range and (b) is neither an optical wide-angle end nor an optical telephoto end, to the optical telephoto end and (2) a second magnification from the predetermined optical zoom position to the optical wide-angle end, wherein both the first magnification and the second magnification are magnifications based on the predetermined optical zoom position regardless of a present zoom position.

30. A non-transitory computer-readable storage medium storing a program for causing a computer to execute a control method for an electronic apparatus, the control method comprising:
a zooming operation step of accepting a zooming operation in which a zoom position of a taking lens is changed; and
a control step of providing control to change the zoom position in response to the zooming operation; and
a display control step of providing control to display a magnification from a predetermined optical zoom position, which (a) is inside an optical zoom range, (b) is neither an optical wide-angle end nor an optical telephoto end, and (c) is independent from a present zoom position, to the present zoom position, wherein the magnification is a magnification based on the predetermined optical zoom position.

31. An electronic apparatus comprising:
a memory and at least one processor which function as units comprising:
a zooming operation unit configured to accept a zooming operation by a user in which a zoom position of a taking lens is changed; and
a control unit configured to provide control to, in response to start of the zooming operation, start shifting the zoom position, and in response to termination of the zooming operation, stop shifting the zoom position,
wherein when the zoom position reaches a predetermined zoom position which (1) is inside an optical zoom range and (2) is neither an optical wide-angle end nor an optical telephoto end while said control unit is shifting the zoom position in a first direction in response to a first zooming operation by a user for shifting the zoom position in the first direction, said control unit provides control to fix the zoom position at the predetermined zoom position even when the first zooming operation by the user has not been terminated,
wherein when the zoom position reaches the predetermined zoom position while said control unit is shifting the zoom position in a second direction opposite to the first direction in response to a second zooming operation for shifting the zoom position in the second direction, said control unit provides control not to fix the zoom position at the predetermined zoom position but to shift the zoom position further in the second direction when the second zooming operation has not been terminated and has been continued.

32. A control method for an electronic apparatus, the control method comprising:
a zooming operation step of accepting a zooming operation by a user in which a zoom position of a taking lens is changed; and
a control step of providing control to, in response to start of the zooming operation, start shifting the zoom position, and in response to termination of the zooming operation, stop shifting the zoom position,
wherein in said control step, when the zoom position reaches a predetermined zoom position which (1) is inside an optical zoom range and (2) is neither an optical wide-angle end nor an optical telephoto end while the zoom position is being shifted in a first direction in response to a first zooming operation by a user for shifting the zoom position in the first direction, control is provided to fix the zoom position at the predetermined zoom position even when the first zooming operation by the user has not been terminated,
wherein when the zoom position reaches the predetermined zoom position while said control step is shifting the zoom position in a second direction opposite to the first direction in response to a second zooming operation for shifting the zoom position in the second direction, said control step provides control not to fix the zoom position at the predetermined zoom position but to shift the zoom position further in the second direction when the second zooming operation has not been terminated and has been continued.

33. A non-transitory computer-readable storage medium storing a program for causing a computer to execute a control method for an electronic apparatus, the control method comprising:
a zooming operation step of accepting a zooming operation by a user in which a zoom position of a taking lens is changed; and
a control step of providing control to, in response to start of the zooming operation, start shifting the zoom position, and in response to termination of the zooming operation, stop shifting the zoom position,
wherein in said control step, when the zoom position reaches a predetermined zoom position which (1) is inside an optical zoom range and (2) is neither an optical wide-angle end nor an optical telephoto end while the zoom position is being shifted in a first direction in response to a first zooming operation by a user for shifting the zoom position in the first direction, control is provided to fix the zoom position at the predetermined zoom position even when the first zooming operation by the user has not been terminated,
wherein when the zoom position reaches the predetermined zoom position while said control step is shifting the zoom position in a second direction opposite to the first direction in response to a second zooming operation for shifting the zoom position in the second direction, said control step provides control not to fix the zoom position at the predetermined zoom position but to shift the zoom position further in the second direction when the second zooming operation has not been terminated and has been continued.

* * * * *